United States Patent
Schweer et al.

(10) Patent No.: US 11,952,041 B2
(45) Date of Patent: Apr. 9, 2024

(54) COCKPIT FOR A VEHICLE

(71) Applicant: Volkswagen Aktiengesellschaft, Wolfsburg (DE)

(72) Inventors: Marcus Schweer, Wolfsburg (DE); Franz-Josef Schulte, Wolfsburg (DE); Ali Jamal Eddine, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 10 days.

(21) Appl. No.: 17/872,685

(22) Filed: Jul. 25, 2022

(65) Prior Publication Data
US 2022/0355866 A1 Nov. 10, 2022

Related U.S. Application Data

(63) Continuation of application No. PCT/EP2021/050958, filed on Jan. 18, 2021.

(30) Foreign Application Priority Data

Jan. 23, 2020 (DE) ............... 10 2020 200 805.1

(51) Int. Cl.
*B62D 21/15* (2006.01)
*B62D 21/09* (2006.01)

(52) U.S. Cl.
CPC ........... *B62D 21/152* (2013.01); *B62D 21/09* (2013.01)

(58) Field of Classification Search
CPC .............................. B62D 21/152; B62D 21/15
See application file for complete search history.

(56) References Cited

U.S. PATENT DOCUMENTS

| 3,794,348 | A | * | 2/1974 | Fischer | B62D 21/152 188/371 |
|---|---|---|---|---|---|
| 5,372,216 | A | * | 12/1994 | Tsuji | B60G 99/00 180/274 |
| 6,601,902 | B1 | | 8/2003 | Rahmstorf et al. | |
| 6,890,016 | B2 | | 5/2005 | Brancheriau | |
| 7,669,688 | B2 | * | 3/2010 | Yamaguchi | B62D 21/152 180/312 |
| 7,762,619 | B2 | * | 7/2010 | Baccouche | B62D 21/152 296/203.02 |

(Continued)

FOREIGN PATENT DOCUMENTS

| CN | 106090799 A | 11/2016 |
|---|---|---|
| DE | 102006018282 A1 | 10/2007 |

(Continued)

OTHER PUBLICATIONS

International Search Report dated Apr. 9, 2021 in corresponding application PCT/EP2021/050958.

*Primary Examiner* — Nicole T Verley
(74) *Attorney, Agent, or Firm* — Muncy, Geissler, Olds & Lowe, P.C.

(57) ABSTRACT

A cockpit for a vehicle, wherein the cockpit comprises a first module with a support and a second module with a support. The support of the second module is arranged in a first direction behind the support of the first module and higher than the support of the first module, so that the support of the first module slides at least partially under the support of the second module in the first direction in a crash case with a force acting on the first module.

8 Claims, 4 Drawing Sheets

(56) References Cited

U.S. PATENT DOCUMENTS

| | | | | |
|---|---|---|---|---|
| 7,887,123 | B2* | 2/2011 | Honji | B62D 25/088 |
| | | | | 296/203.02 |
| 8,231,166 | B2* | 7/2012 | Mori | B62D 21/152 |
| | | | | 296/203.02 |
| 8,562,068 | B2* | 10/2013 | Yoshida | B62D 21/152 |
| | | | | 296/187.11 |
| 8,585,129 | B2* | 11/2013 | Mori | B62D 21/152 |
| | | | | 296/187.09 |
| 9,145,170 | B2* | 9/2015 | Mori | F16F 7/12 |
| 9,283,995 | B2 | 3/2016 | Hisazumi et al. | |
| 9,849,913 | B2* | 12/2017 | Sugano | B62D 21/152 |
| 11,603,134 | B2* | 3/2023 | Leier | B62D 21/15 |
| 2005/0065665 | A1* | 3/2005 | Mae | F16F 7/12 |
| | | | | 701/1 |
| 2010/0026047 | A1* | 2/2010 | Baccouche | B62D 21/152 |
| | | | | 296/187.09 |
| 2010/0090498 | A1 | 4/2010 | Jungert et al. | |
| 2012/0280538 | A1 | 11/2012 | Lummitsch et al. | |
| 2017/0021869 | A1 | 1/2017 | Staines | |

FOREIGN PATENT DOCUMENTS

| | | | | |
|---|---|---|---|---|
| DE | 102011009605 A1 | | 8/2012 | |
| DE | 102016010612 A1 | | 3/2018 | |
| DE | 102019204789 A1 | * | 10/2020 | ............ B60L 3/0007 |
| DE | 102021121942 A1 | * | 3/2023 | |
| EP | 0456531 A1 | | 11/1991 | |
| EP | 1032528 A1 | | 9/2000 | |
| EP | 1323593 B1 | | 2/2005 | |
| EP | 2314500 A2 | * | 4/2011 | ............ B62D 21/11 |
| EP | 2481644 A1 | * | 8/2012 | ............ B60K 37/00 |
| EP | 3098101 A1 | | 11/2016 | |
| JP | 2012210907 A | | 11/2012 | |
| WO | WO-2009040309 A1 | * | 4/2009 | ............ B61D 15/06 |
| WO | WO-2010097690 A1 | * | 9/2010 | ............ B62D 21/152 |
| WO | WO-2010146306 A1 | * | 12/2010 | ........ B60H 1/00564 |
| WO | WO-2013018401 A1 | * | 2/2013 | ............ B62D 21/11 |
| WO | WO-2013061408 A1 | * | 5/2013 | ............ B62D 21/152 |
| WO | WO2013035042 A1 | | 3/2014 | |
| WO | WO-2021148355 A1 | * | 7/2021 | ............ B62D 21/09 |

\* cited by examiner

COCKPIT FOR A VEHICLE

This nonprovisional application is a continuation of International Application No. PCT/EP2021/050958, which was filed on Jan. 18, 2021, and which claims priority to German Patent Application No. 10 2020 200 805.1, which was filed in Germany on Jan. 23, 2020, and which are both herein incorporated by reference.

BACKGROUND OF THE INVENTION

Field of the Invention

The present invention relates to a cockpit for a vehicle.

Description of the Background Art

In principle, it is known from the prior art to use a cockpit in the front area of a vehicle, which is intended to absorb forces in the event of a frontal impact in order to protect the passengers.

For example, JP 2012-210 907 A describes a corresponding cockpit that has a deformation element.

EP 3 098 101 A1 shows a dashboard of a motor vehicle arranged to deform in the event of an impact.

In vehicles with a short front end and/or a forward-reaching cockpit, the cockpit is impacted by the intruding frontal crash barrier in the event of a frontal impact and is therefore subjected to relatively high loads. In unfavorable circumstances, the cockpit can be displaced into the passenger compartment together with the front passenger airbag in the event of a frontal impact.

SUMMARY OF THE INVENTION

It is therefore an object of the present invention to further develop a cockpit for a vehicle in such a way that the displacement of the cockpit into the passenger compartment can be reduced in the event of a frontal crash.

In an exemplary embodiment, the aforementioned object is solved by a cockpit for a vehicle comprising a first module with a support and a second module with a support, wherein the support of the second module is arranged in a first direction behind the support of the first module. Further, the support of the second module is arranged higher than the support of the first module. Due to the arrangements of the support of the first module, and thus preferably of the entire first module, the latter slides in the first direction at least partially under the support of the second module in a crash case with a force acting on the first module.

The cockpit can be arranged in a front area, in particular in a frontal area, of the vehicle. In particular, it is arranged below the windshield. A crash case with a force acting on the first module in the first direction is thus a frontal crash case. A crash case within the meaning of the present patent application is to be understood in particular as a frontal impact.

In a crash case, the support of the first module slides at least partially under the support of the second module. This reduces the displacement of the cockpit into the passenger compartment. The displacement of the support of the first module, namely at least partially under the support of the second module, is ensured by the support of the second module being arranged in a first direction behind the support of the first module and higher than the support of the first module. The depth or height is determined in particular in a second direction which is perpendicular to the first direction.

In particular, the first direction extends in a longitudinal direction of the vehicle, while the second direction corresponds to the height direction of the vehicle. Therefore, the term "height" preferably refers to the extension in the height direction of the vehicle.

In particular, the support of the first module and the support of the second module are arranged directly behind each other in the first direction. In particular, the center of gravity of the support of the second module is arranged higher than the center of gravity of the support of the first module. Further, the support of the first module and the support of the second module each have a highest point, wherein the highest point of the support of the second module is located above the highest point of the support of the first module.

In a crash case with a force acting on the first module in the first direction, the support of the first module slides in the direction of the support of the second module. In other words, the frontal crash barrier is displaced in the direction of the second module. The fact that the support of the first module slides under the support of the second module can reduce the displacement of the cockpit into the passenger compartment and also, if necessary, reduce the risk of the cockpit structure breaking open.

In particular, the support of the second module at least partially encloses a free space, whereby the support of the first module slides into the free space in the crash case. This helps to ensure that the support of the first module can slide under the support of the second module, thus reducing the displacement of the entire cockpit. In particular, the support of the second module is configured in such a way that the free space is arranged below the support of the second module.

The support of the first module mainly contributes to the rigidity of the first module. In particular, the support is made of glass fiber-reinforced plastic. In addition to the support, the first module can have other modules or components that are attached to the support via connections, for example clips or welds. The second module can also have a support and preferably further elements, for example an airbag. Furthermore, the cockpit can also have a module cross-member that accommodates the second module of the cockpit.

In particular, the support of the first module has predetermined buckling points so that the support of the first module folds up in a Z-shape in the crash case. In particular, the support of the first module folds up like an accordion in the crash case and thus significantly reduces the displacement of the cockpit into the passenger compartment. This is ensured by providing predetermined buckling points so that the first module deforms in a predictable and controlled manner. The first module thus serves mainly to absorb forces in a corresponding crash case and to dissipate them by deformation. However, the aim is to ensure that the cockpit as a whole slides as little as possible into the passenger compartment. In particular, the Z-fold of the first module extends at least roughly in the first direction. In particular, the support of the first module has at least three, preferably exactly three, regions, a predetermined buckling point being formed between respective adjacent regions. In particular, the support is formed in one piece.

The predetermined buckling points can be formed by a geometric formation of the support and/or by local material weakening. The term "geometric formation" is to be understood in particular as meaning that the support already has an angled formation before the crash, i.e. in prefabricated form, which ensures that the support folds accordingly at the already angled regions. Thus, a Z-folding can be at least indicated by the geometry of the first module and it can be ensured that the first module folds correspondingly "further" in the first direction in the event of an impact with a force acting on the first module.

Furthermore, a reduced height of the support in the second direction may represent a geometric formation and thus constitute a predetermined buckling point.

Local material weakenings may be formed that cause the first module to fold at the appropriate points.

In particular, the support of the first module has a first region, wherein the first region is at an angle of between 5° and 15°, preferably between 7.5° and 12.5°, in particular at an angle of about 10°, to the first direction in a longitudinal section of the cockpit in the first direction and the second direction.

Further, the support of the first module may have a second region that is angled with respect to the first region. In particular, the second region encloses an angle with the first direction that is between 100° and 150°, in particular between 120° and 130°, in particular about 125°. The first region and the second region thus enclose an angle with respect to each other that is preferably between 90° and 130°, in particular between 110° and 120°.

Further preferably, the support of the first module has a third region, wherein the third region includes an angle with the first direction that is between 10° and 40°, in particular between 20° and 30°, most preferably about 25°. The third region and the second region thus include an angle with respect to each other of between 90° and 110°, in particular between 95° and 105°. Due to the angled formation of the support of the first module, predetermined buckling points are formed between the different regions.

In particular, the first module and the second module are connected to each other by the engaging of lugs of the first module and recesses of the second module. The lugs are in particular sheet metal lugs. In particular, they are arranged on the support of the first module. The lugs engage in recesses of the second module, which are arranged in particular on the support of the second module. The first module and the second module are thus connected to each other by staking. The second module acts as a counter bearing to the first module when the first module is pushed together. By connecting the first module to the second module, the first module is pulled into the free space under the second module.

In the first and/or third region, the support of the first module can further have downward projections. The projections serve as air ducts.

The support of the first module, in particular its first region, second region and third region, enclose a height region except for the projections in the first and third regions. The support of the second module is also arranged in this entire height region, wherein the support of the second module extends upwards out of the height region and is thus arranged higher overall, so that the second module or its support can act as an counter bearing and thus the support of the first module can fold together in a Z-shape on one side and can slide into the free space below the support of the second module on the other side.

The lugs for fastening the first module to the second module extend in particular in the first direction, wherein the support of the first module folds in the crash case in such a way that the lugs are pulled out of the recesses and the connection between the first module and the second module is released. The connection is released in particular by the fact that the lugs are pulled out of the recesses as a result of the folding.

In particular, the first region has a first end and a second end, wherein it merges into the second region at the second end. Further, the second region has a first end and a second end, wherein it merges into the first region at the first end and into the third region at its second end. In doing so, the support of the first module folds such that the second end of the first region erects. Further, the first end of the third region is also pushed downward, causing the lugs to pull out of the recesses. In particular, the first end of the third region or the second end of the second region slides towards the first end of the first region.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
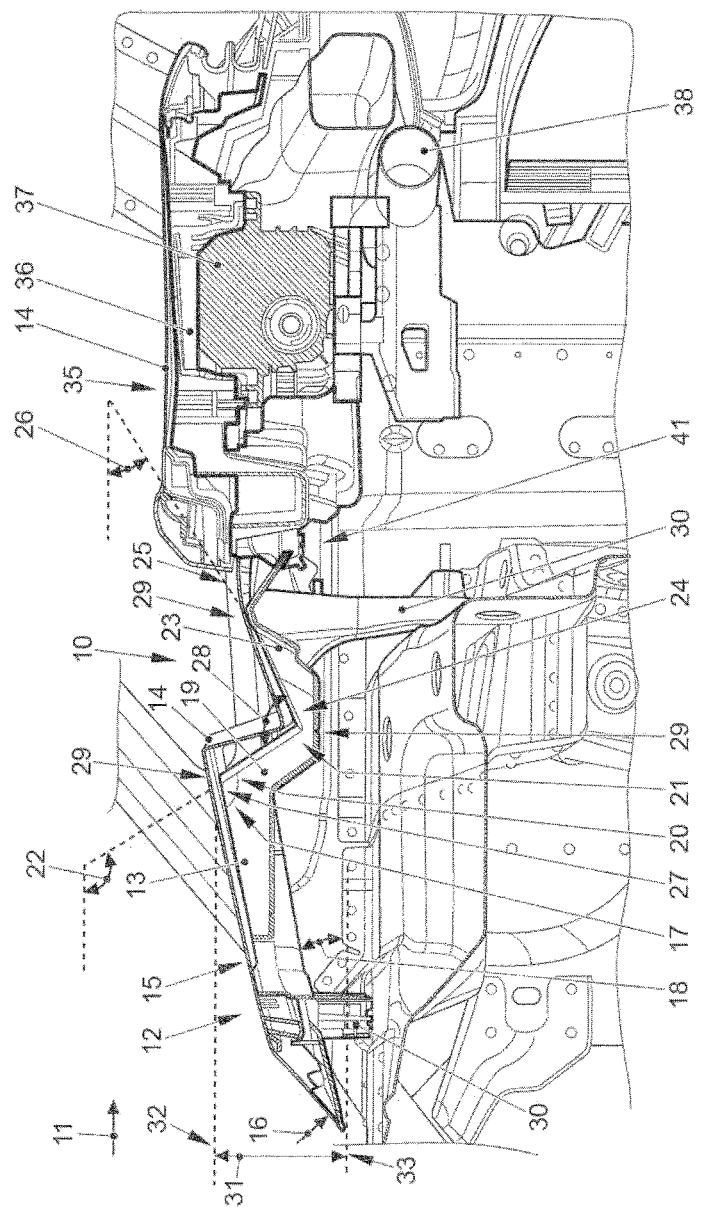
FIG. 1 is a sectional view of a cockpit according to the invention along the first direction as well as the height direction of a vehicle.

FIG. 1 shows a sectional view of a cockpit 10 according to the invention along the first direction 11 as well as the height direction of a vehicle.

The cockpit 10 has a first module 12 and a second module 35. The first module 12 comprises a support 13, and the second module 35 comprises a support 36. Furthermore, the first module 12 comprises a top 14.

The support 13 is already preformed at an angle so that it folds in a Z-shape in the first direction 11 in a crash case with a force applied to the first module 12. The support 13 has a first region 15 with a first end 16 facing the first direction 11 and a second end 17. Further, the support 13 has a second region 19 with a first end 20 and a second end 21, and a third region 23 with a first end 24 and a second end 25.

Predetermined buckling points 29 are formed between the corresponding regions. These are formed by a geometrical formation of the support 13. Namely, the first region 15 includes a first angle 18 with the first direction 11, while the second region 19 includes a second angle 22 with the first direction 11. The third region 23 includes a third angle 26 with the first direction 11. Further, the first region 15 includes a fourth angle 27 with the second region 19, and the second region 19 includes a fifth angle 28 with the third region 23.

The first region 15 of the support 13 has projections 30 which project downwards in FIG. 1. The same applies to the third region 23, which also has corresponding projections 30. Except for the projections 30, the support 13 of the first module 12 includes a height region 31 with an upper end 32 and a lower end 33. The support 36 of the second module 35 is arranged at least over the entire height of the height region 31 and protrudes beyond the upper end 32 of the height region 31, so that it is arranged higher overall than the support 13 of the first module 12.

Further, the second module 35 may comprise an air bag 37 and a cross member 38.

Figure 2:
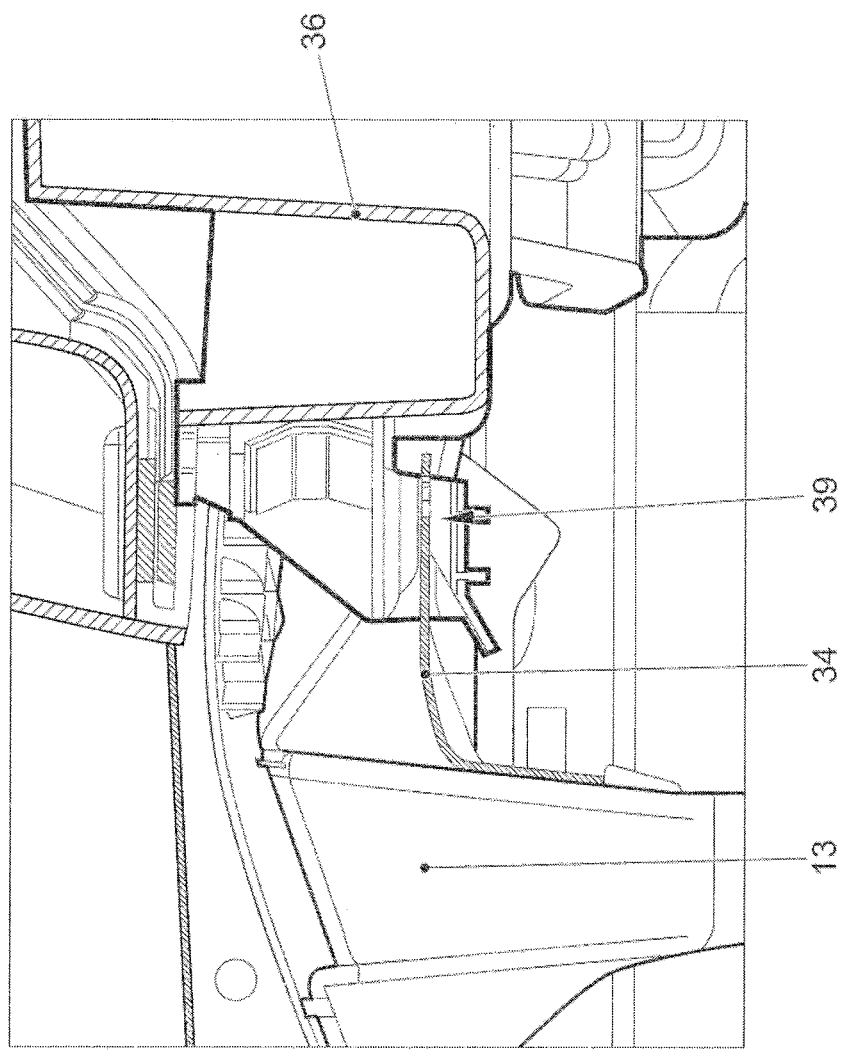
FIG. 2 is a detailed view of the connection region between the support of the first module and the support of the second module of FIG. 1.

FIG. 2 shows a detailed view of the connection region between the support 13 of the first module 12 and the support 36 of the second module 35 of FIG. 1. The support 13 of the first module 12 has lugs 34 which engage in recesses 39 of the support 36 of the second module 35.

Figure 4:
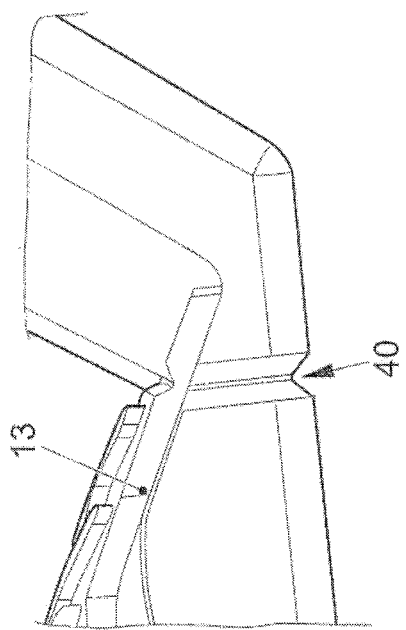
FIG. 4 is a perspective view of a portion of the support of the first module.
Figure 3:
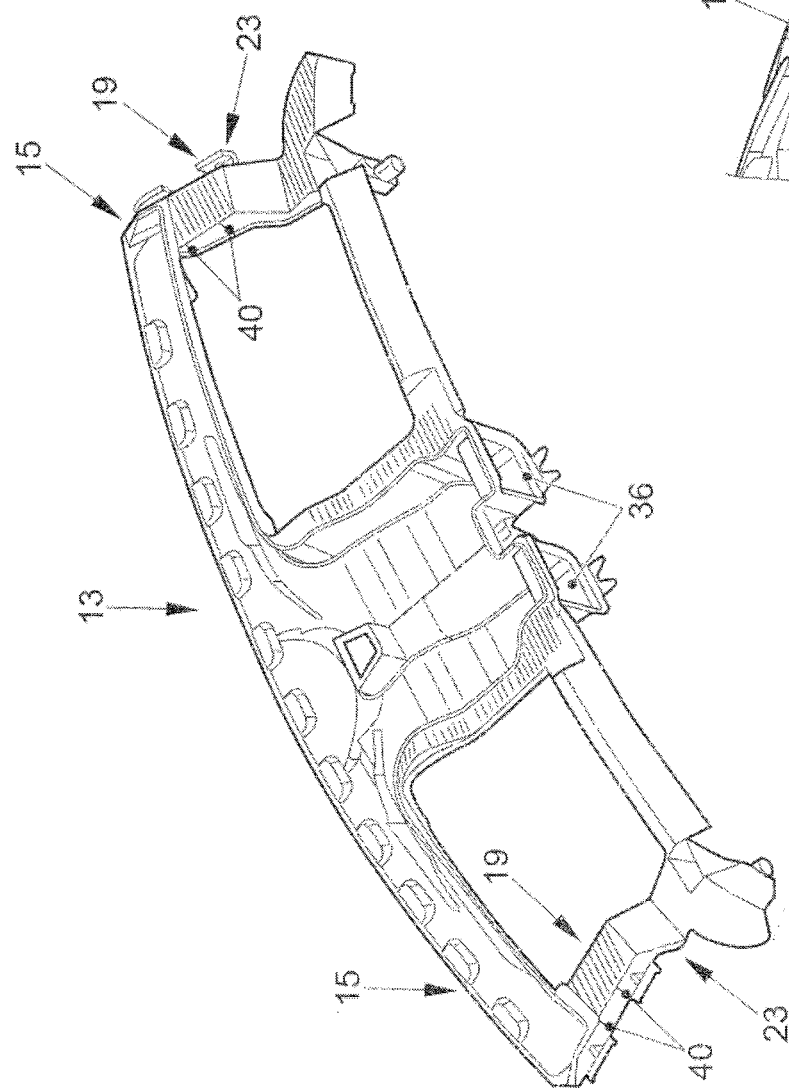
FIG. 3 is a perspective view of the support of the first module of the cockpit of FIG. 1.

FIG. 3 shows a perspective view of the support 13 of the first module 12 of the cockpit 10. Clearly visible are the protrusions 30 as well as the different regions, namely the first region 15, the second region 19 and the third regions 23 of the support 13. Material weakenings 40 are provided which contribute to the formation of corresponding predetermined buckling points. A corresponding material weakening 40 can also be seen, for example, in FIG. 4, which shows a perspective view of a region of the support 13 of the first module 12.

Figure 6:
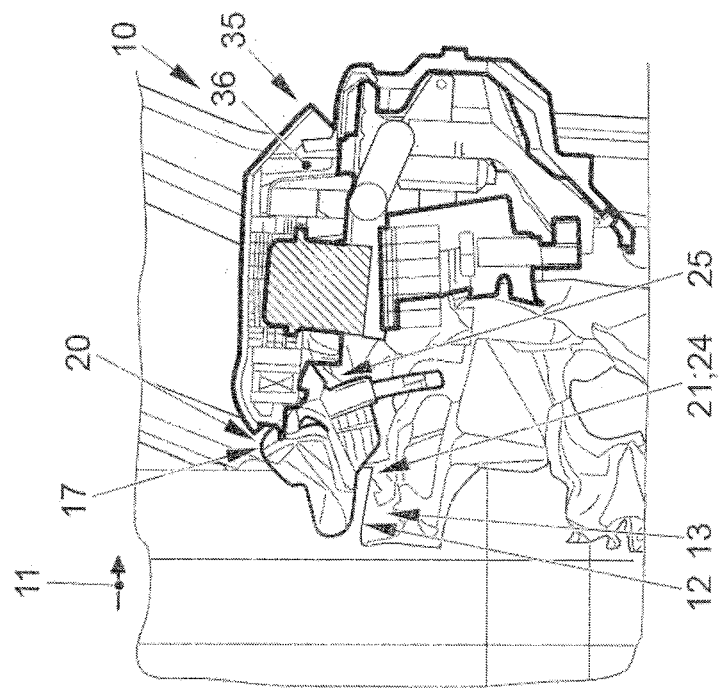
FIGS. 5 and 6 show folding of the support of the first module of the cockpit of FIG. 1 in a crash case with a force applied to the first module in the first direction.
Figure 5:
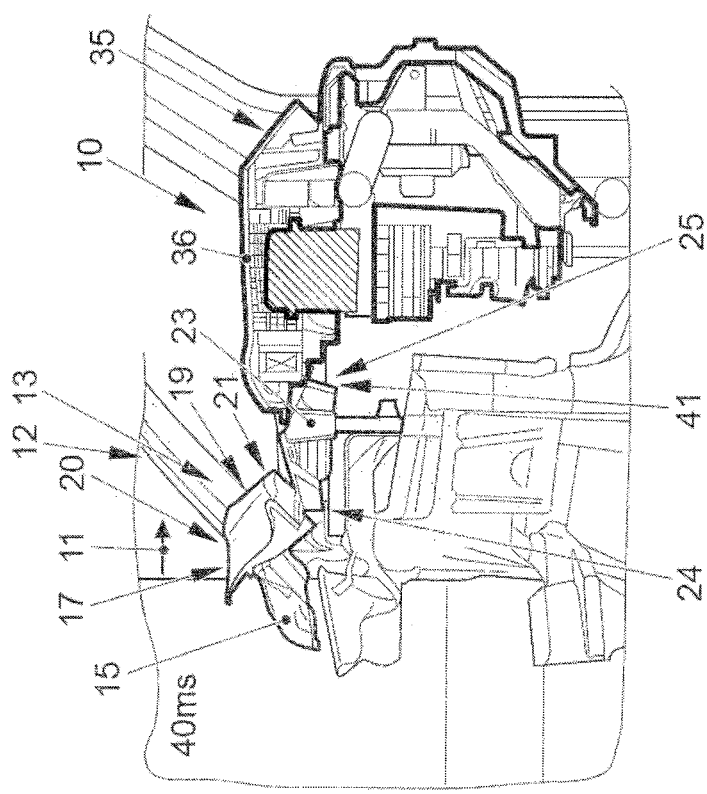

In FIGS. 5 and 6, it is shown how the support 13 of the first module 12 of the cockpit 10 folds in the first direction 11 in a crash case with a force applied to the first module 12. Namely, it can be seen there how the second end 17 of the first region 15 slides upwards, while, as can be seen in FIG. 6, the first end 24 of the third region 23 slides downwards. Furthermore, the first end 24 of the third region 23 and the second end 21 of the second region 19, respectively, slide towards the first end 16 of the first region 15. After the first module 12 has been Z-folded to the second module 35, which acts as a counter-bearing, the first module 12 is pulled into the free space 41 below the second module 35.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A cockpit for a vehicle, the cockpit comprising:
a first module with a first support; and
a second module with a second support arranged in a first direction behind the first support of the first module and higher than the first support of the first module, so that, in a crash case with a force acting on the first module in the first direction, the first support of the first module slides at least partially under the second support of the second module,
wherein the first module and the second module are connected to each other by an engaging of lugs of the first module and recesses of the second module.

2. The cockpit according to claim 1, wherein the second support of the second module at least partially encloses a free space, and wherein the first support of the first module slides into the free space in the crash case.

3. The cockpit according to claim 1, wherein the first support of the first module has predetermined buckling points so that the first support of the first module folds in a Z-shape in the crash case.

4. The cockpit according to claim 3, wherein the first support of the first module has at least three regions, and wherein a predetermined buckling point is formed between respective adjacent regions.

5. The cockpit according to claim 3, wherein the predetermined buckling points are formed by a geometric formation of the first support and/or by local material weakenings.

6. The cockpit according to claim 5, wherein the geometric formation is an angled formation of the first support and/or a reduced height of the first support.

7. The cockpit according to claim 1, wherein the lugs extend in the first direction, wherein the first support of the first module folds in the first direction in a crash case with a force acting on the first module such that the lugs are pulled out of the recesses and the connection between the first module and the second module is released.

8. A vehicle comprising a cockpit according to claim 1.

* * * * *